United States Patent
Chen et al.

(10) Patent No.: US 8,300,152 B2
(45) Date of Patent: Oct. 30, 2012

(54) TV IMAGE ADJUSTING METHOD AND APPARATUS THEREOF

(75) Inventors: Mei-Ju Chen, Hsinchu Hsien (TW); Jen-Shi Wu, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 305 days.

(21) Appl. No.: 12/767,557

(22) Filed: Apr. 26, 2010

(65) Prior Publication Data
US 2010/0302449 A1 Dec. 2, 2010

(30) Foreign Application Priority Data

Jun. 2, 2009 (TW) ................................ 98118156 A

(51) Int. Cl.
*H04N 5/57* (2006.01)
(52) U.S. Cl. ........................................................ 348/687
(58) Field of Classification Search .................. 348/687, 348/678, 607, 611, 614, 618; 382/260, 275, 382/254, 218, 210, 241
See application file for complete search history.

(56) References Cited

U.S. PATENT DOCUMENTS

| | | | | |
|---|---|---|---|---|
| 5,524,626 A * | 6/1996 | Liu | ................................ | 600/442 |
| 5,875,040 A * | 2/1999 | Matraszek et al. | ............. | 358/453 |
| 6,847,737 B1 * | 1/2005 | Kouri et al. | .................... | 382/260 |
| 6,941,017 B2 * | 9/2005 | Ferguson | ...................... | 382/210 |
| 7,184,595 B2 * | 2/2007 | Hel-Or et al. | ................. | 382/218 |
| 7,272,265 B2 * | 9/2007 | Kouri et al. | .................... | 382/260 |
| 7,889,943 B1 * | 2/2011 | Christian | ....................... | 382/275 |
| 8,059,905 B1 * | 11/2011 | Christian | ....................... | 382/254 |
| 2010/0225789 A1 * | 9/2010 | Gheorghe et al. | ............. | 348/241 |

FOREIGN PATENT DOCUMENTS

| | | |
|---|---|---|
| CN | 1766927 A | 5/2006 |
| CN | 1989525 A | 6/2007 |

OTHER PUBLICATIONS

First Examination Opinion issued by State Intellectual Property Office of China on Jun. 22, 2011 regarding Chinese Patent Application No. 200910143547.6 (Document U.S. Appl. No. 2011061800073180).

* cited by examiner

*Primary Examiner* — Paulos Natnael
(74) *Attorney, Agent, or Firm* — Andy M. Han; Han IP Law PLLC

(57) ABSTRACT

A television (TV) image adjusting method includes performing a variance calculation on luminance values of a plurality of pixels adjacent to target pixels of an image frame to generate a weight index; performing a decay function calculation according to the weight index to generate a weight distribution corresponding to the plurality of pixels adjacent to the target pixels. A function value of the decay function is inversely proportional to both the weight index and a target pixel distance between the target pixels and the plurality of pixels adjacent to the target pixels. The target pixel distance is a sum of vertical distances and horizontal distances between the target pixels and the plurality of pixels adjacent of the target pixels. The method further performs a weight calculation on the luminance values of the plurality of pixels adjacent to target pixels according to the weight distribution to generate an output luminance value.

7 Claims, 5 Drawing Sheets

TV IMAGE ADJUSTING METHOD AND APPARATUS THEREOF

CROSS REFERENCE TO RELATED PATENT APPLICATIONS

This patent application claims priority from Taiwan Patent Application No. 098118156, filed in the Taiwan Patent Office on Jun. 2, 2009, which is hereby incorporated in its entirety by reference.

TECHNICAL FIELD

The present disclosure relates to television (TV) image processing, and more particularly, to a TV image noise processing method and an apparatus thereof.

BACKGROUND OF THE PRESENT DISCLOSURE

When a TV image is received, noises in the TV image are generally present. The noises are due to various types of interferences during a transmission process of the TV image and a discontinuous block effect resulted from image compression, with the discontinuous block effect being regarded as high frequency (HF) noises. In order to remove noises of a TV image, a common approach is to apply a low-pass filter to remove HF components of the image signal, so that a discontinuous block caused by the discontinuous block effect is smoothed. However, in a filtering process, although the noises are reduced, edges formed by connecting two groups of areas comprising different pixel luminance values are blurred due to smoothing.

In order to solve the foregoing problem, a non-linear map technology, i.e., a Gamma Map filter, is applied in the prior art, and an algorithm thereof is:

$$y(t) = \frac{(\alpha-2)*z^2 + \sqrt{z^2*(\alpha-2)^2 + 8\alpha*z*x(t)}}{2\alpha},$$

and $$\alpha = 2 \bigg/ \left(\frac{s^2}{z^2} - 1\right),$$

where s2 represents a luminance variance of an image pixel, z represents a luminance average of the image pixel, x(t) presents an original luminance value of a pixel position t, and y(t) represents an updated luminance value of the pixel position t. A disadvantage of the Gamma Map filter is that the calculation complexity as well as the application cost is rather high.

A motion averaging technology, i.e., a Lee filter, is applied in the prior art, and an algorithm thereof is:

$$y(t) = \beta x(t) + (1-\beta)z, \text{ and } \beta = \max\left(\frac{s^2 - s_n^2}{s^2}, 0\right),$$

where $s^2$ represents a luminance variance of an image pixel, z presents a luminance average of the image pixel, $s^2$ represents an estimated noise variance, x(t) represents an original luminance value of a pixel position t, and y(t) represents an updated luminance value of the pixel position t. A disadvantage of the Lee filter is that not only the noise filtering effect is unsatisfactory but also edges are blurred from averaging.

Therefore, it is necessary to provide a low-cost solution capable of effectively removing noises of a TV image with a low calculation complexity while maintaining distinct edges.

In view of the foregoing problem, the present disclosure provides a novel algorithm to remove noises of a TV image, and the algorithm is capable of adaptively adjusting a weight distribution corresponding to a plurality of pixel adjacent to a target pixel of an image frame, and performing a weight calculation on luminance values of the plurality of pixels adjacent to the target pixel according to the weight distribution to generate an updated luminance value.

SUMMARY OF THE PRESENT DISCLOSURE

One object of the present disclosure is to provide a low-cost TV image adjusting method capable of adaptively adjusting a weight distribution of a plurality of pixels adjacent to a target pixel of an image frame, so as to effectively remove noises of the TV image while maintaining distinct edges.

Another object of the present disclosure is to provide a TV image noise removing solution with a low calculation complexity, so as to realize updating luminance values of pixels by applying a processor look-up table algorithm or a circuit hard-wired approach.

In order to achieves the foregoing objects, a TV image adjusting method provided by the present disclosure comprises performing a statistics calculation on luminance values of a plurality of pixels adjacent to a target pixel of an image frame to generate a weight index; performing a decay function calculation according to the weight index to generate a weight distribution corresponding to the plurality of pixels adjacent to the target pixel, wherein a function value of the decay function is inversely proportional to both the weight index and a target pixel distance of the plurality of pixels adjacent to the target pixel, wherein the target pixel distance is a sum of vertical distances and horizontal distances between the target pixel and the neighboring pixels; and performing a weight calculation on luminance values of the plurality of pixels adjacent to the target pixel according to the weight distribution to generate an output luminance value.

In order to achieve the foregoing objects, a TV image adjusting apparatus provide by the present disclosure comprises a buffer, for temporarily storing luminance values of a plurality of pixels adjacent to a target pixel of an image frame of an interlaced scanning signal; a weight calculator, coupled to the buffer, for performing a statistic calculation on the luminance values of the plurality of pixels adjacent to the target pixel to generate a weight index, and performing a decay function calculation according to the weight index to generate a weight distribution corresponding to the plurality of pixels adjacent to the target pixel; a luminance adjusting unit, coupled to the buffer and the weight calculator, for generating an output luminance signal, which is generated from performing a weight calculation on the luminance values of the plurality of pixels adjacent to the target pixel according to the weight distribution; and a de-interlacing module, coupled to the luminance adjusting unit, for converting the output luminance signal to a progressive scanning signal.

In order to achieve the foregoing objects, a TV image adjusting apparatus provided by the present disclosure comprises an de-interlacing module, for converting an interlaced scanning signal to a progressive scanning signal; a buffer, coupled to the de-interlacing module, for temporarily storing luminance values of a plurality of pixels adjacent to a target pixel of an image frame of the progressive scanning signal; a weight calculator, coupled to the buffer, for performing a statistic calculation on the luminance values of the plurality of pixels adjacent to the target pixel to generate a weight index, and performing a decay function calculation according to the weight index to generate a weight distribution corresponding to the plurality of pixels adjacent to the target pixel; and a luminance adjusting unit, coupled to the buffer and the weight calculator, for generating an output luminance signal, which is generated from performing a weight calculation on the luminance values of the plurality of pixels adjacent to the target pixel according to the weight distribution.

The advantages and spirit related to the present disclosure can be further understood via the following detailed description and drawings.

DETAILED DESCRIPTION OF THE PREFERRED EMBODIMENT

In an embodiment of the present disclosure, a noise removing calculation is performed according to luminance values of a target pixel of an image frame and a plurality of neighboring pixels associated with the target pixel to generate an updated luminance value of the target pixel. An algorithm of this embodiment is represented by: $y(t)=\Sigma i(m(ti)x(ti))/\Sigma i(m(ti))$, where y(t) represents the updated luminance value of the target pixel of the image frame, $m(t)=f(a|t|)$ is a weight distribution, $a=h(s^2)$ is a weight index, $s^2$ is a luminance variance of the neighboring pixels, |t| represents a target pixel distance which is a sum of horizontal distances and vertical distances between the neighboring pixels and the target pixel, and the weight distribution f(a|t|) is inversely proportional to the weight index a. The weight distribution f(a|t|) is defined as but not limited to $e^{-Ka|t|}$.

A table of weight values corresponding to a target pixel y(t) of a 3×3 image blocks is:

| m2 | m1 | m2 |
|----|----|----|
| m1 | y<sub>me</sub> | m1 |
| m2 | m1 | m2 | where mc represents a weight value of the target pixel, m1 represents a weight value of a pixel at a distance 1 from the target pixel, m2 represents a weight value of a pixel at a distance 2 from the target pixel, and mc is equal to 1, m1 is equal to $e^{-Ka}$ and m2 is equal to $e^{-2Ka}$.

A table of weight values corresponding to a target pixel y(t) of a 3×5 image blocks is:

| m3 | m2 | m1 | m2 | m3 |
|----|----|----|----|----|
| m2 | m1 | y<sub>me</sub> | m1 | m2 |
| m3 | m2 | m1 | m2 | m3 | where mc represents a weight value of the target pixel, m1 represents a weight value of a pixel at a distance 1 from the target pixel, m2 represents a weight value of a pixel at a distance 2 from the target pixel, m3 represents a weight value of a pixel at a distance 3 from the target pixel, and mc is equal to 1, m1 is equal to $e^{-Ka}$, m2 is equal to $e^{-2Ka}$ and m3 is equal to $e^{-3Ka}$.

Figure 1:
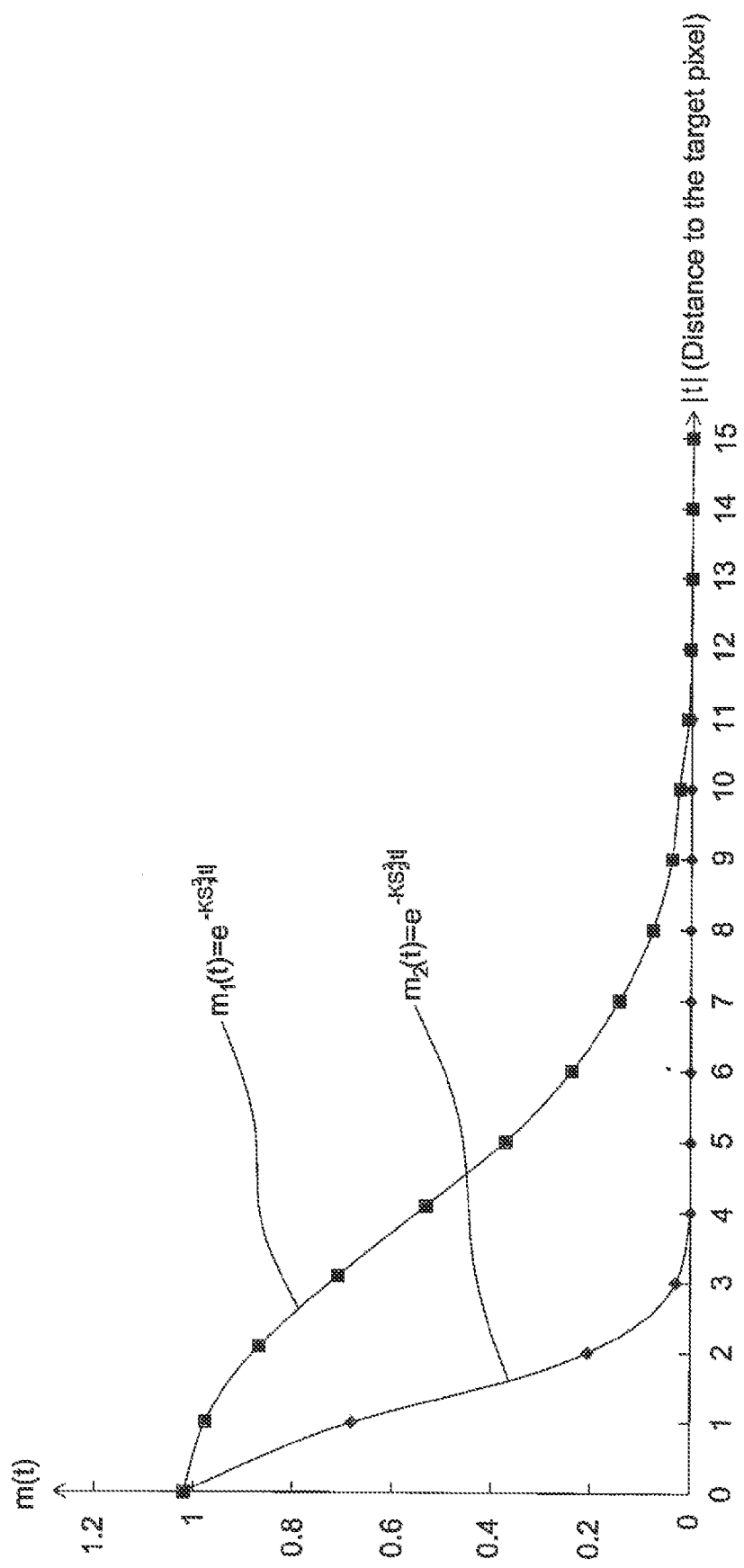
FIG. 1 is a schematic diagram of weight distribution lines $m_1(t)$ and $m_2(t)$ corresponding to two different variances s1 and s2.

A level, the weight distribution f(a|t|), of the target pixel is directly proportional to the weight index a, i.e., the luminance variance of the neighboring pixels $s^2$. Refer to FIG. 1 showing weight distribution lines $m_1(t)$ and $m_2(t)$ corresponding to two different luminance variances $s_1^2$ and $s_2^2$, where $s_2^2$, is greater than $s_1^2$. The weight distribution line $m_2(t)$ has a greater recession ratios than the weight distribution line $m_1(t)$, i.e., when a luminance variance of an image frame becomes greater, a weight distribution converges to the target pixel. Taking luminance values corresponding to 8 bytes of a 3×3 image blocks with a distinct edge as an example:

| 0 | 255 | 255 |
|---|-----|-----|
| 0 | y<br>255 | 255 |
| 0 | 0 | 0 | and a luminance variance of 18062.5 is the greatest luminance variance of the 3×3 image blocks. At this point, the weight distribution converges to the target pixel, such that an updated luminance value y of the target pixel is approximated to an original luminance value 255 of the target pixel. Accordingly, the edge of the image blocks shall be kept intact and but not be blurred as a result of an average effect.

In addition, the weight index a is inversely proportional to a luminance average z of the image frame, and a weight distribution of the image frame is described with reference to four examples below.

Example 1

Suppose that the luminance average is 64 and the luminance variance is 10 in the 3×3 image blocks, m1 is equal to $e^{-K(10/4096)}$ and m2 is equal to $e^{-K(20/4096)}$.

Example 2

Suppose that the luminance average is 64 and the luminance variance is 100 in the 3×3 image blocks, m1 is equal to $e^{-K(100/4096)}$ and m2 is equal to $e^{-K(200/4096)}$.

Example 3

Suppose that the luminance average is 128 and the luminance variance is 10 in the 3×3 image blocks, m1 is equal to $e^{-K(10/16384)}$ and m2 is equal to $e^{-K(20/16384)}$.

Example 4

Suppose that the luminance average is 128 and the luminance variance is 100 in the 3×3 image blocks, m1 is equal to $e^{-K(100/16384)}$ and m2 is equal to $e^{-K(200/16384)}$.

The luminance averages of 64 in Examples 1 and 2 are smaller than the luminance averages of 128 in Examples 3 and 4, such that the weight distributions of Examples 1 and 2 are more converging than those of Examples 3 and 4. That is, according to the present disclosure, when calculating an updated luminance value of a target pixel in the event that an image frame has a lower luminance value, a pixel closer to the target pixel is given a higher weight. However, the approach of jointly applying the luminance variance and the luminance average to determine a weight is an embodiment of the present disclosure, and other approaches may also be used without departing from the spirit and scope of the present disclosure. For example, a weight is determined based on only the luminance variance without considering the luminance average. But in a special case, a pixel closer to the target pixel has a higher weight when the image frame has a high luminance average value, e.g., an image data received by a complementary metal-oxide-semiconductor (CMOS) image sensor.

Figure 2:
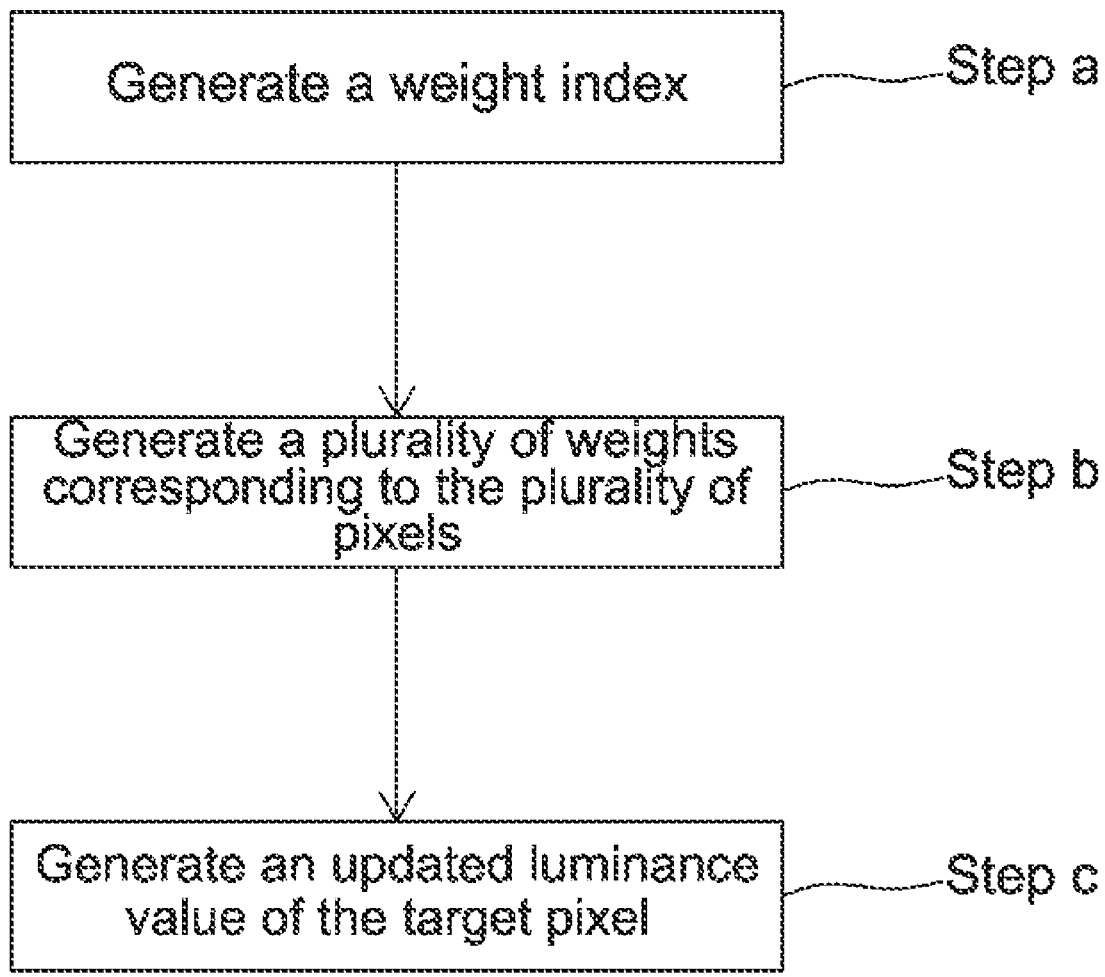
FIG. 2 is a flow chart of a TV image adjusting method in accordance with an embodiment of the present disclosure.

According to the foregoing idea regarding noise removing, referring to FIG. 2, a TV image adjusting method according to an embodiment of the present disclosure comprises generating a weight index (Step a), generating a plurality of weights (Step b), and generating an updated luminance value of a target pixel (Step c).

In Step a, a statistics calculation is performed on luminance values of a plurality of neighboring pixels associated with the target pixel of an image frame to generate the weight index. The statistics calculation comprises an arithmetical average calculation and a variance calculation. The arithmetical average calculation is for generating a luminance average of the image frame. The variance calculation is for generating a luminance variance of the image frame. The weight index is directly proportional to the luminance variance and is inversely proportional to the square of the luminance average.

In Step b, according to the weight index and distances between the plurality of pixels adjacent to the target pixel and the target pixel, a decay function calculation is performed to generate the plurality of weights corresponding to the plurality of pixels, such that the plurality of weights form a weight distribution, which is inversely proportional to a product of the weight index and the distances. For example, the decay function is an exponential function and the decay function calculation may be a look-up table search.

In Step c, according to the weight distribution, a weight calculation is performed on the luminance values of the target pixel and the plurality of pixels adjacent to the target pixel to generate an output luminance value, which represents the updated luminance value of the target pixel.

Figure 3:
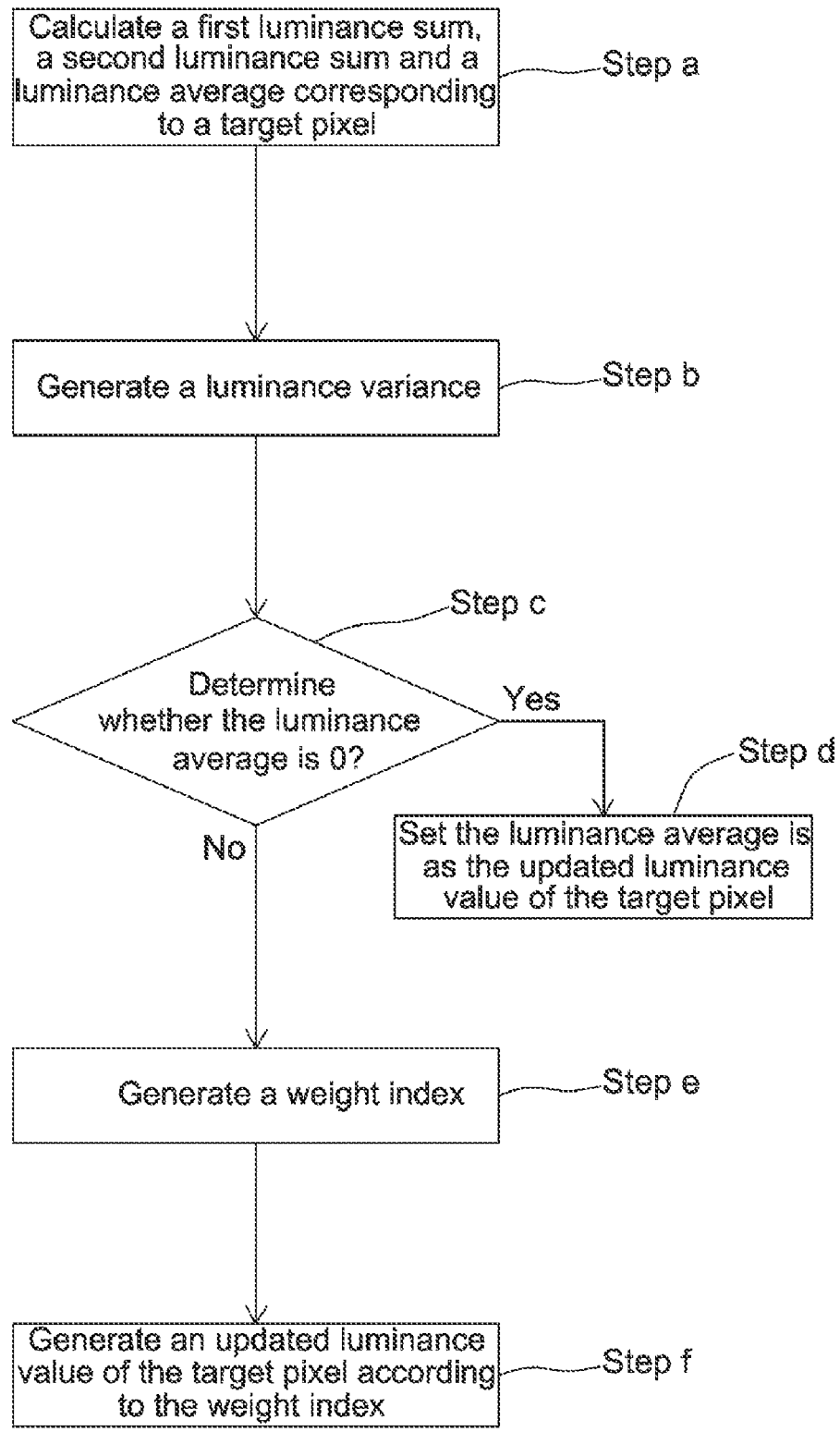
FIG. 3 is a flow chart of a TV image adjusting method in accordance with another embodiment of the present disclosure.

According to the foregoing idea regarding noise removing, referring to FIG. 3, a TV image adjusting method according to another embodiment of the present disclosure comprises generating a first luminance sum, a second luminance sum and a luminance average, which are corresponding to a target pixel (Step a); generating a luminance variance (Step b); determining whether the luminance variance is 0 (Step c); if yes, setting the luminance average as an updated luminance value of the target pixel (Step d); otherwise, generating a weight index (Step e); and generating the updated luminance value of the target pixel according to the weight index (Step f).

In Step a, luminance values of a 3×3 image blocks are represented by a table below.

| $X_{11}$ | $X_{12}$ | $X_{13}$ |
|---|---|---|
| $X_{21}$ | $Y$ $x_{22}$ | $X_{23}$ |
| $X_{31}$ | $X_{32}$ | $X_{33}$ |

A first addition is performed on the 3×3 image blocks to generate a first luminance sum SUM1 (SUM1=$x_{12}$+$x_{21}$+$x_{23}$+$x_{32}$) by calculating the sum of the luminance value of the neighboring pixels with 1 distance, a second addition is performed on the 3×3 image blocks to generate a second luminance sum SUM2 (SUM2=$x_{11}$+$x_{13}$+$x_{31}$+$x_{33}$) by calculating the sum of the luminance value of the neighboring pixels with 2 distances, and a luminance average calculation is performed to generate a luminance average z (z=(SUM1+SUM2)/8.

In Step b, a statistics calculation is performed on the luminance average z and luminance values of a plurality of neighboring pixels associated with the target pixel, i.e., the squares of differences between the luminance average z and the luminance values of the plurality of pixels are accumulated to generate a luminance variance $s^2$.

$$s^2 = \left( \begin{array}{l} VarMeanNumeTable(|x_{11} - z|) + \\ VarMeanNumeTable(|x_{12} - z|) + \\ VarMeanNumeTable(|x_{13} - z|) + \\ VarMeanNumeTable(|x_{21} - z|) + \\ VarMeanNumeTable(|x_{23} - z|) + \\ VarMeanNumeTable(|x_{31} - z|) + \\ VarMeanNumeTable(|x_{32} - z|) + \\ VarMeanNumeTable(|x_{33} - z|) \end{array} \right) / 8$$

VarMeanNumeTable is a look-up table for obtaining squares of variables, and the variances are obtained via the look-up table to reduce circuit complexity or calculation resources; however, the variances in the present disclosure are not limited to being obtained via the look-up table, e.g., the variances are also obtained via a circuit calculation.

In Step c, it is determined whether the luminance average z is 0. When the answer is positive, Step d is performed; otherwise, Step e is performed.

In Step d, the luminance average z is set as the updated luminance value y of the target pixel.

In Step e, a weight index a (a=K*$s^2$*VarMeanDenoTable(z)) is generated according to the luminance variance $s^2$ and the luminance average z, and VarMeanDenoTable(z) is a look-up table for obtaining reciprocals of squares of input variables. The reciprocals of squares of input variables are obtained via the look-up table to reduce circuit complexity or calculation resources; however, the reciprocals of squares of input variables are not limited to being obtained via the look-up table, e.g., they are obtained via a circuit calculation.

In Step f, a principle of generating the updated luminance value y of the target pixel according to the weight index a is described below:

when a≧63, y=$x_{22}$;
when 30<a<63,
y={Weightm1Table(a) * SUM1+[256−Weightm1Table(a)/4] * $x_{22}$}/256; and
when a≦30,
    y={Weightm1Table(a) * SUM1+Weightm2Table(a) *

$$SUM2+[256-(\text{Weightm1Table}(a)+\text{Weightm2Table}(a))/4] * x_{22}\}/256,$$

where Weightm1Table is a look-up table for obtaining weights of pixels $x_{12}, x_{21}, x_{23}$, and $x_{32}$ at a distance 1 from the target pixel, and Weightm2Table is a look-up table for obtaining weights of pixels $x_{11}, x_{13}, x_{31}$ and $x_{33}$ at a distance 2 from the target pixel. In addition, a sum of 4 multiplied by Weightm1Table(a), 4 multiplied by Weightm2Table(a), and a weight of $x_{22}$ is equal to 256.

Figure 4A:
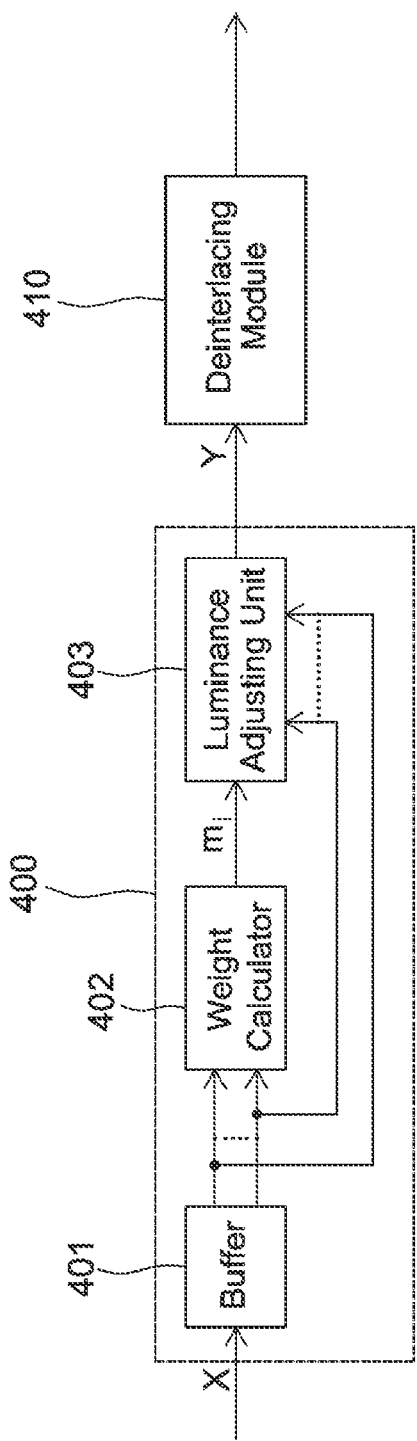
FIG. 4*a* is a block diagram of a TV image adjusting apparatus in accordance with an embodiment of the present disclosure.

According to the foregoing idea regarding noise removing, referring to FIG. 4a, a TV image adjusting apparatus according to an embodiment of the present disclosure comprises an image adjusting module 400 and a de-interlacing module 410.

The image adjusting module 400 comprises a buffer 401, a weight calculator 402, and a luminance adjusting unit 403.

The buffer 401 temporarily stores luminance values of a target pixel of an image field of an interlaced scanning signal x and a plurality of neighboring pixels associated with the target pixel.

The weight calculator 402, coupled to the buffer 401, performs a statistics calculation comprising a luminance average calculation and a luminance variance calculation on the luminance values of the plurality of pixels adjacent to the target pixel, generates a weight index according to the luminance values of the plurality of pixels adjacent to the target pixel, and performs a decay function calculation on the weight index, so as to generate a weight distribution $m_i$ ($m_i = e^{-Ka|t|}$) corresponding to the plurality of pixels adjacent to the target pixel.

The luminance adjusting unit 403, coupled to the buffer 401 and the weight calculator 402, generates an output luminance signal Y corresponding to a result obtained from weight the luminance of the plurality of pixels adjacent to the target pixel according to the weight distribution $m_i$.

The de-interlacing module 410, coupled to the luminance adjusting unit 403, converts the updated image frame from an interlaced scanning field frame to a progressive scanning image frame.

Figure 4B:
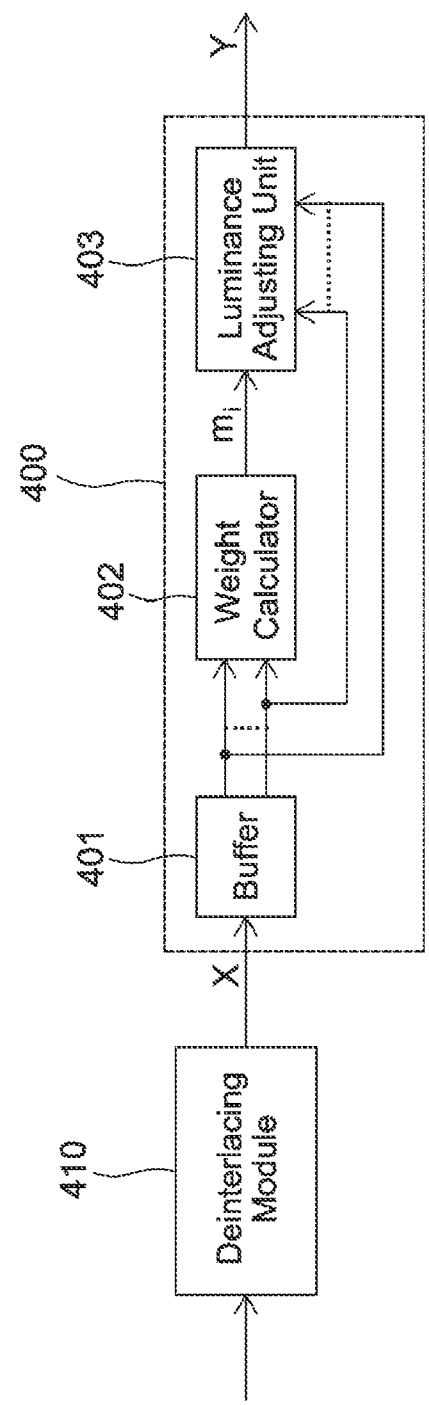
FIG. 4*b* is a block diagram of a TV image adjusting apparatus in accordance with another embodiment of the present disclosure.

According to the foregoing idea regarding noise removing, referring to FIG. 4b, a TV image adjusting apparatus according to another embodiment of the present disclosure comprises an image adjusting module 400 and a de-interlacing module 410.

The image adjusting module 400 comprises a buffer 401, a weight calculator 402 and a luminance adjusting unit 403.

The buffer 401 temporarily stores luminance values of a target pixel of an image frame of a progressive scanning signal and a plurality of neighboring pixels associated with the target pixel.

The weight calculator 402, coupled to the buffer 401, performs a statistics calculation comprising a luminance average calculation and a luminance variance calculation on the luminance values of the plurality of pixels adjacent to the target pixel, generates a weight index according to the luminance values of the neighboring pixels, and performs a decay function calculation on the weight index, so as to generate a weight distribution $m_i$ ($m_i = e^{-Ka|t|}$) corresponding to the plurality of pixels adjacent to the target pixel.

The luminance adjusting unit 403, coupled to the buffer 401 and the weight calculator 402, generates an output luminance signal Y corresponding to a result obtained from weight the luminance of the plurality of pixels adjacent to the target pixel according to the weight distribution $m_i$.

The de-interlacing module 410, coupled to the buffer 401, converts the updated image frame from an interlaced scanning field frame to a progressive scanning image frame.

Figure 5:
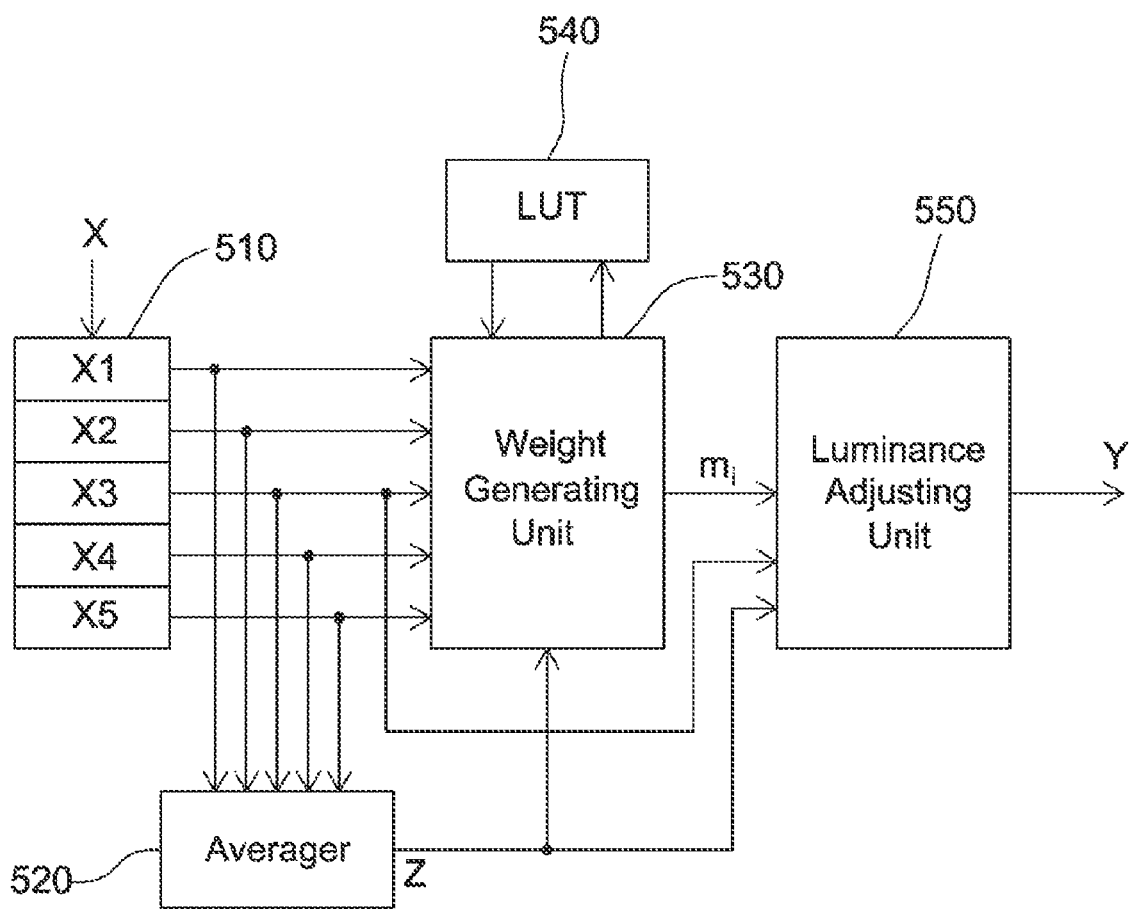
FIG. 5 is a block diagram of an image adjusting module of a TV image adjusting apparatus in accordance with an embodiment of the present disclosure.

According to the foregoing idea regarding noise removing, referring to FIG. 5, a TV image adjusting apparatus according to yet another embodiment of the present disclosure comprises a pixel buffer 510, an averager 520, a weight generating unit 530, a look-up table 540 and a luminance adjusting unit 550.

The pixel buffer 510 temporarily stores luminance values of five pixels x1 to x5, wherein x3 is a target pixel, and x1, x2, x4 and x5 are pixels adjacent to the target pixel.

The averager 520 coupled to the buffer 510 generates a luminance average z according to the luminance values of the pixels x1 to x5, and the luminance average z also can be generated via a weight average calculation approach.

The weight generating unit 530, coupled to the buffer 510 and the averager 520, performs a statistics calculation on the luminance values of the pixels x1 to x5 and the luminance average z to generate a weight index. For example, absolute differences between the luminance values of the pixels x1 to x5 and the luminance average z are added up to generate the weight index. The weight generating unit 530 looks up the look-up table 540 according to the weight index to generate a weight $m_i$.

The look-up table 540, coupled to the weight generating unit 530, is stored with mapping information between the weight index and the weight, such that the weight generating unit 530 obtains the weight according to the weight index.

The luminance adjusting unit 550, coupled to the buffer 510, the averager 520 and the weight generating unit 530, generates an updated luminance value of the target pixel, wherein the updated luminance value Y is generated from weighting the luminance value of the target pixel x3, the luminance average z and the weight $m_i$.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A TV image adjusting apparatus that adjusts a luminance value of a target pixel of an image frame, the apparatus comprising:
    a buffer that stores the luminance value of the target pixel and luminance values of a plurality of pixels adjacent to the target pixel;
    a weight calculator, coupled to the buffer, that performs a variance calculation on the luminance values of the plurality of pixels adjacent to the target pixel to generate a luminance variance, generates a weight index according to the luminance variance, and performs a decay function calculation on the weight index to generate a weight distribution, the weight distribution being inversely proportional to distances between the plurality of pixels adjacent to the target pixel and the target pixel; and
    a luminance adjusting unit, coupled to the buffer and the weight calculator that performs a weight calculation on the luminance value of the target pixel and the luminance values of the plurality of pixels adjacent to the target pixel according to the weight distribution to generate an updated luminance value of the target pixel.

2. The apparatus as claimed in claim 1, wherein the weight calculator performs an arithmetical calculation on the luminance values of the plurality of pixels adjacent to the target pixel to generate a luminance average, and generates the weight index according to the luminance average.

3. The apparatus as claimed in claim 2, wherein the weight calculator performs a multiplication of a reciprocal of a square of the luminance average and the luminance variance.

4. The apparatus as claimed in claim 1, wherein the decay function is an exponential function.

5. The apparatus as claimed in claim 1, wherein the decay function calculation is a look-up table search.

6. The apparatus as claimed in claim 2, wherein the distances between the plurality of pixels adjacent to the target pixel and the target pixel are sums of vertical distances and horizontal distances between the plurality of pixels adjacent to the target pixel and the target pixel.

7. A TV image adjusting apparatus that adjusts a luminance value of a target pixel of an image frame, comprising:
- a buffer that stores the luminance value of the target pixel and luminance values of a plurality of neighboring pixels associated with the target pixel;
- a storage unit that stores a look-up table comprising mapping information between weight indexes and weights related to the luminance value of the target pixel and the luminance values of the neighboring pixels;
- an averager, coupled to the buffer, that generates a luminance average according to the luminance value of the target pixel and the luminance values of the neighboring pixels;
- a weight generating unit, coupled to the buffer, the storage unit and the averager, that performs a variance calculation on the luminance values of the neighboring pixels and the luminance average to generate a weight index, and performs a look-up table search according to the weight index to obtain a weight value corresponding to the target pixel; and
- a luminance adjusting unit, coupled to the buffer, the averager and the weight generating unit, that generates an updated luminance value of the target pixel by weighting the luminance value of the target pixel and the luminance average according to the weight value.

* * * * *